United States Patent [19]

Klaubert

[11] Patent Number: 4,980,679
[45] Date of Patent: Dec. 25, 1990

[54] TIME VARYING IDENTIFICATION BADGE

[76] Inventor: Earl C. Klaubert, 12 Minuteman La., Lexington, Mass. 02173

[21] Appl. No.: 346,250

[22] Filed: May 1, 1989

Related U.S. Application Data

[63] Continuation of Ser. No. 74,941, Jul. 17, 1987, abandoned.

[51] Int. Cl.⁵ .............................................. G09G 3/00
[52] U.S. Cl. .................... 340/765; 340/784; 340/825.34; 40/1.5; 40/1.6; 235/380; 235/382; 235/382.5
[58] Field of Search ............... 340/755, 756, 765, 784, 340/309.15, 825.31, 825.34, 825.69, 825.3; 40/1.5, 1.6; 368/10; 235/380, 382, 382.5

[56] References Cited

U.S. PATENT DOCUMENTS

| | | | |
|---|---|---|---|
| 4,303,996 | 12/1981 | Schmitz | 340/755 |
| 4,352,102 | 9/1982 | Kramer | 340/784 |
| 4,394,654 | 7/1983 | Hofmann-Cerfontaine | 235/380 |
| 4,403,869 | 9/1983 | Crutcher | 368/10 |
| 4,417,413 | 11/1983 | Hoppe et al. | 40/630 |
| 4,521,771 | 6/1985 | Alton | 340/815.31 |
| 4,531,310 | 7/1985 | Acson et al. | 40/1.5 |
| 4,542,982 | 9/1985 | Haas | 40/1.6 |
| 4,573,046 | 2/1986 | Pinnow | 340/825.31 |
| 4,597,206 | 7/1986 | Benson | 40/1.6 |
| 4,637,148 | 1/1987 | Barlow | 40/1.5 |
| 4,646,080 | 2/1987 | Genest | 340/825.31 |
| 4,758,718 | 7/1988 | Fujisaki et al. | 235/380 |
| 4,801,787 | 1/1989 | Suzuki | 235/380 |
| 4,827,112 | 5/1989 | Yoshino et al. | 235/380 |

OTHER PUBLICATIONS

"World Awaits LCD Revolution", by Michael S. Malone in *Boston Globe*, May 25, 1987.
The 60 Second Password; advertisement of access control encryption.

*Primary Examiner*—Alvin E. Oberley
*Assistant Examiner*—Richard A. Hjerpe
*Attorney, Agent, or Firm*—Hamilton, Brook, Smith & Reynolds

[57] ABSTRACT

A reusable identification badge having a time varying display with a programmable memory. The configurations exhibited on the display are altered at predetermined time intervals. A specific sequence of configurations, each having visually distinctive shapes or symbols, can be programmed for display on a liquid crystal display panel.

27 Claims, 3 Drawing Sheets

TIME VARYING IDENTIFICATION BADGE

This is a continuation of co-pending application Ser. No. 07/074,941 filed on July 17, 1987, now abandoned.

BACKGROUND OF THE INVENTION

The present invention relates to time varying identification badges, and more particularly, to a reusable badge system with a programmable memory.

The necessity of discriminating between authorized and unauthorized persons has generated the widespread use of identification systems for control of access to secure areas or facilities. Existing identification systems typically use a badge with some method of uniquely associating the badge with the individual wearing it. These methods include photographs, signatures, finger prints, etc. The unauthorized use of such security badges can become a problem, especially where large numbers of people are involved, or where there is high turnover, so that individual recognition cannot be relied upon.

There have been attempts to overcome the limits of these systems which may be easily counterfeited. U.S. Pat. No. 4,542,982 discloses a method for making badges which vary with time by employing a light sensitive badge which changes color after a specified period of time thereby blocking out validating information. The badge generated by this system is discarded after the preset exposure time has elapsed.

An electroluminescent badge used for promotional and display purposes is disclosed in U.S. Pat. No. 4,637,148. Although not used for security identification, this patent does recite the use of an electrically illuminated panel worn as a badge in which the illumination can be periodically interrupted.

Liquid crystal displays have been developed for a number of applications where the use of a miniaturized display instrument is preferable to using traditional cathode ray tubes. Wrist watches and calculators are common examples of the use of liquid crystal displays. See for example, U.S. Pat. No. 4,352,102, and the references cited therein.

SUMMARY OF THE INVENTION

This invention discloses a reusable identification badge enclosed in a housing having a display panel on one side on which a plurality of different configurations, each comprised of a plurality of selectable shapes or symbols, can be displayed. The appearance of each shape or symbol can be altered at predetermined time intervals to change configurations.

A liquid crystal display can be used where the panel is split into a number of shapes in which each shape can be triggered separately. These shapes may consist of unusual geometrical formations, letters, numbers, or other abstract symbols. A specific configuration is unique as it has at least one shape whose appearance is different in any other configuration. Each shape appearance can be altered to change configuration, for example, by turning the liquid crystal for that shape from the "off" to the "on" state or vice versa. Each configuration is thus defined by a unique combination of shapes, with each shape in a specific state defined by the display system. Other systems may be used to display time-varying configurations such as an electroluminescent panel, a dot-matrix or plasma display.

In addition to altering the configuration at predetermined time intervals, a specific or random sequence of configurations can be stored in a programmable memory. Such a sequence defines a "cycle." When the housing is opened to permit reprogramming of the cycle of configurations, and the time intervals at which they are switched, the existing stored cycle is erased.

A preferred embodiment of the invention involves the use of a liquid crystal display panel that has been subdivided into eight shapes. This permits the programming of up to $2^8$ or 256 different configurations.

The identification badge in another embodiment includes an area for displaying information identifying the wearer of the badge along with a mechanism for attaching the badge to the wearer's clothing. The attaching mechanism can be constructed so that any attempt to grab the badge without releasing the mechanism will break the attaching mechanism from the display and cause the erasure of the programmed cycle.

DETAILED DESCRIPTION OF THE INVENTION

The present invention provides a reusable identification badge with an easily-read display of configurations that change at chosen time intervals. Enough badges for all security personnel can be programmed to change displayed configurations at the same time. This permits each person wearing a badge to determine the current configuration by glancing at his or her own badge. Any person having a badge with an improper configuration can easily be identified by any authorized badge wearer.

As the cycle of configurations is known only by a restricted group of persons, any attempt at theft and unauthorized use of the badge will be restricted to the duration of use of the existing programmed cycle. Any attempt to open the badge results in the erasure of the existing cycle memory so that tampering with the badge will render it inoperative. As the number of possible configurations, and the sequence through which they can be displayed can be made very substantial, any attempt to reprogram the memory without access to the authorized cycle will be difficult.

Figure 1:
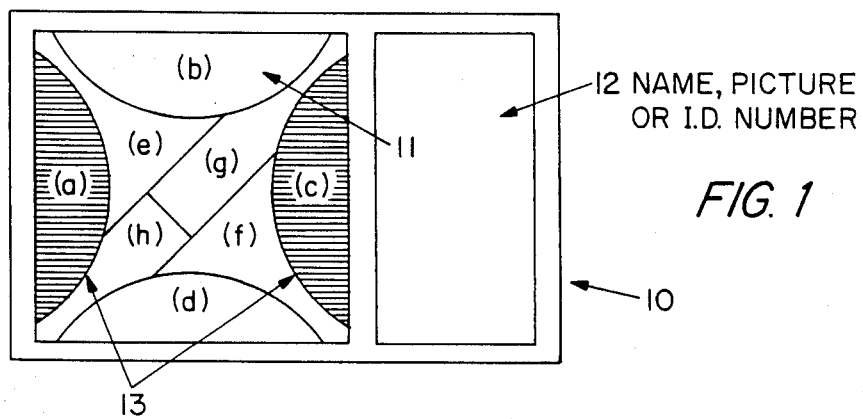
FIG. 1 illustrates a time varying identification badge with one possible array of shapes in one configuration.

FIG. 1 illustrates a preferred embodiment of the invention wherein the badge 10 has a display area 12 located adjacent to a time-varying liquid crystal display (LCD) 11. The adjacent area 12 can be used for a picture of a specific individual, for a printed name, or ID No., etc. or for any other information designed to identify a specific individual wearing the badge. The LCD 11 can be divided into two or more independently triggered shapes. This particular embodiment utilizes eight shapes (FIG. 1 (a-h)), two of which (a and c) have been darkened 13 to show a particular configuration.

FIG. 2 (A-L) depicts 12 of the 256 possible configurations of the 8 segment LCD panel of FIG. 1. Liquid crystal displays have a crystalline material in liquified form sandwiched between transparent surfaces. Light normally scattered by the crystal is transmitted by the crystal when an electric field is applied causing alignment of the crystal molecules. Thus, each shape is triggered between these two states by applying a potential between electrodes which generates an electric field across that shape on the liquid crystal.

Figure 3A:
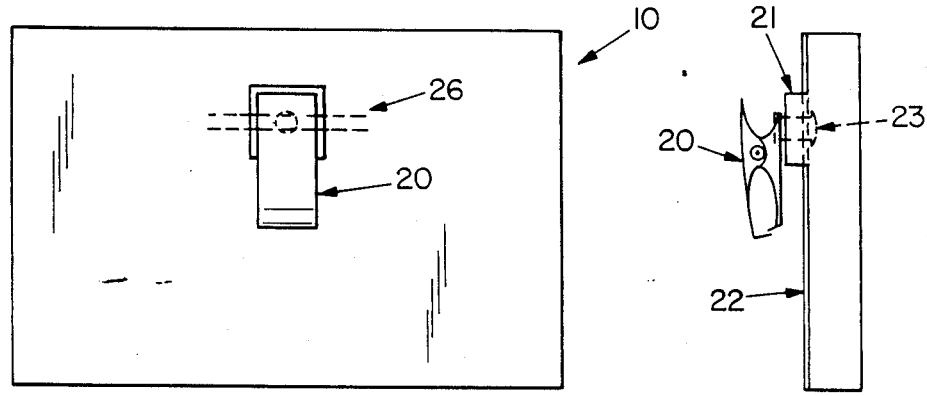
FIG. 3 (A-C) illustrates a mechanism for attaching the badge to a person along with a magnified view of the breakaway design.
Figure 3B:
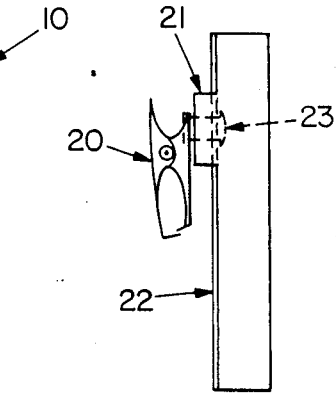
Figure 3C:
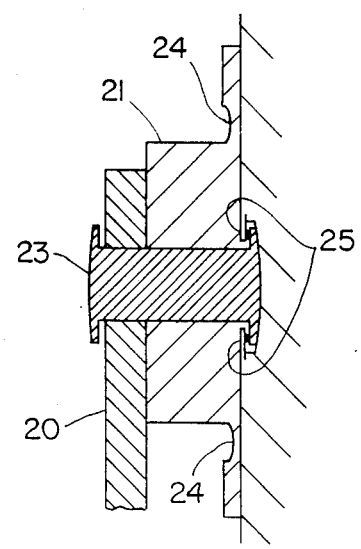
Figure 2A:
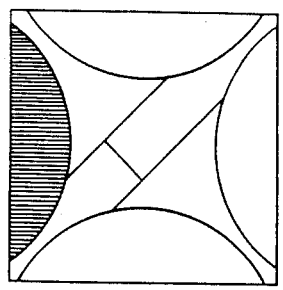
FIG. 2 (A-L) illustrates additional configurations that are possible for the array of shapes depicted in FIG. 1.
Figure 2B:
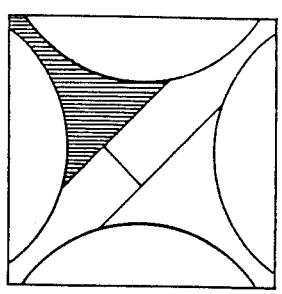
Figure 2C:
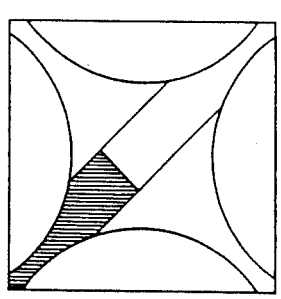
Figure 2D:
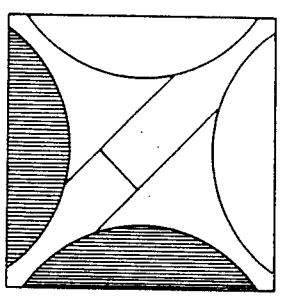
Figure 2E:
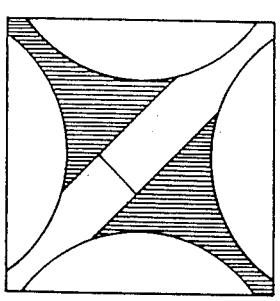
Figure 2F:
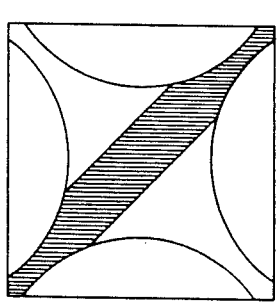
Figure 2G:
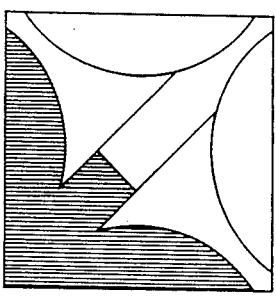
Figure 2H:
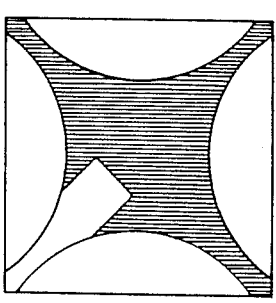
Figure 2I:
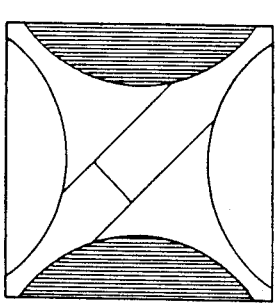
Figure 2J:
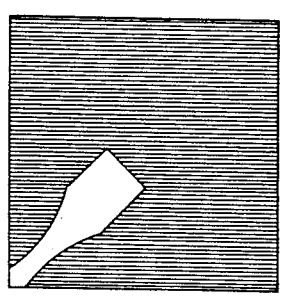
Figure 2K:
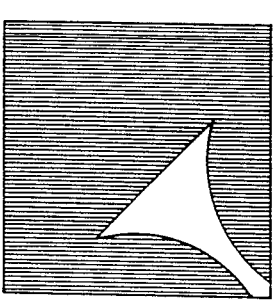
Figure 2L:
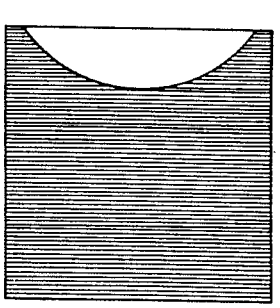

FIG. 3(A-C) illustrates how the case 10 can be equipped with a secure clasp 20 or other means of attaching the badge to a person's clothing. The clasp is designed to cause erasure of the programmed set of configurations and resetting of the clock to zero time if the badge is broken away from the clasp, whether by accident or by forcible theft. The clasp can be mounted onto a thickened portion 21 of a panel 22 secured to the rear of the badge. (See FIG. 3B). A rivet 23 secures the clasp to the panel 22. There are weakening slots 24 surrounding the portions 21 designed to fracture and release the clasp 20 from the badge if sufficient force is applied. The wire 26, or contacts 25, illustrated in FIGS. 3(A) and 3(C) respectively, are positioned so that release of the rivet 23 and the attached clasp 20 and portion 21 will result in the triggering of the memory erasure.

Figure 4:
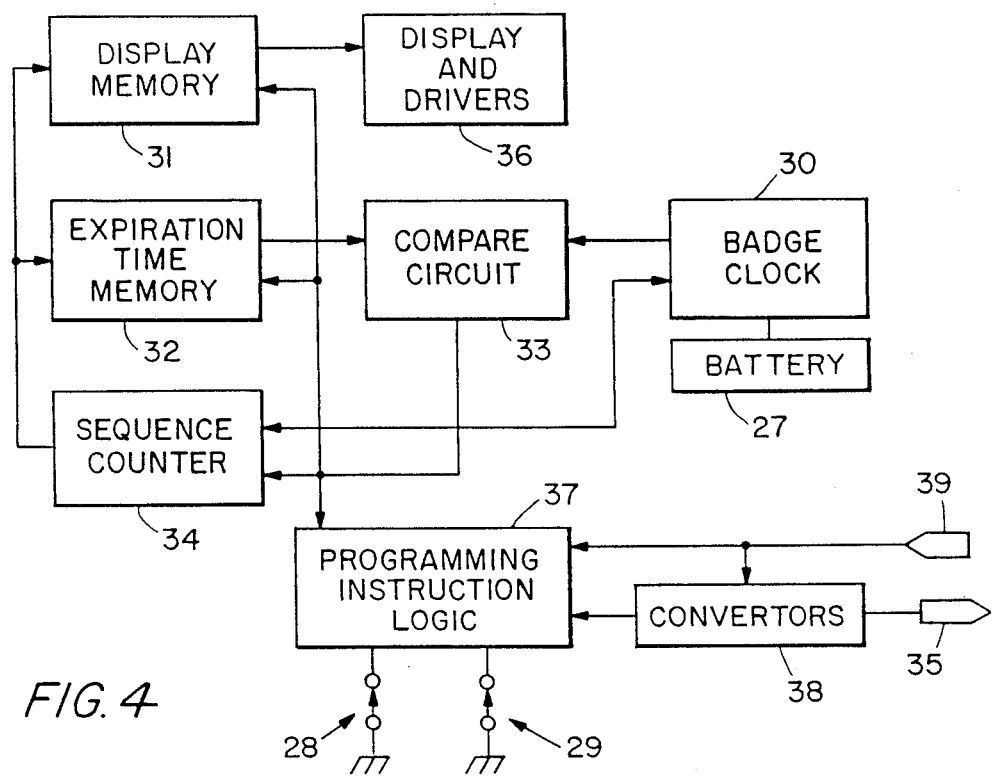
FIG. 4 is a schematic diagram of the circuit elements for the programmable time varying identification badge.

FIG. 4 shows the basic elements making up a preferred embodiment of the circuit for a time varying identification badge. The badge consists of a clock 30, two memory banks (one for display patterns 31, one for expiration times 32), a comparator 33 to compare the value of the clock to the value of the expiration time at the current location, and a counter 34 (called the sequence counter) to address both memory banks. The badge also contains the circuitry necessary to program each of the above elements via a serial link 35 with the programmer 37. The convertor 38 can contain 13-bit parallel to serial and serial to parallel convertors to provide a suitable interfacing system. The entire system is powered by battery 27 shown here connected only to the clock 30 for clarity.

In operation, the sequence counter 34 begins at 0, causing the display to show the contents of the display memory 31 at location zero. At the same time, one input of the comparator 33 is fed with the value of the expiration time memory 32 at that location. When the clock 30 is equal to or exceeds the value of the expiration time memory currently addressed, the sequence counter is incremented, causing the next display to be shown via display 36 and the next time to be input to the comparator.

The programming circuit 37 allows both memory banks (at the location pointed to by the sequence counter), the clock via link 39 to the programmer clock, and the sequence counter to be programmed and read in a random access fashion. It includes the necessary logic to convert the serial programming data into a parallel format for internal use, to convert the internal parallel data back to serial format (convertor 38), and the decoding of control bits to determine what element is to be read or written. Connector 35 is the source of serial data to and from the external programmer. The programming circuit also includes a circuit to detect when the badge is disconnected from and then reconnected to the programmer, or when the housing for the badge is opened by switch 28, or lastly when the clasp is detached from the badge by switch 29. When one of these conditions is detected, the programming circuit clears the entire badge including the display, all the memory, and resets the clock.

The description is general enough that it applies to two embodiments of the badge, the difference being that one is implemented in hardware and the other is done in software with a standard microprocessor.

Figure 5:
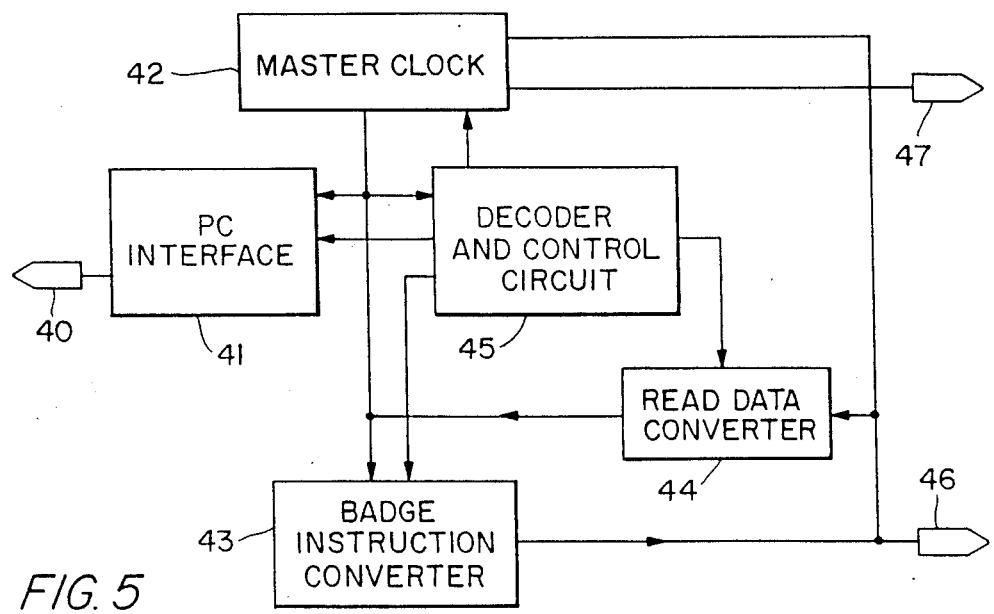
FIG. 5 illustrates the external mechanism used for the programming of the cycle of configurations.

FIG. 5 illustrates the external programming system which consists of two elements; a personal computer (PC), connected at 40 and the format translator box shown in detail. The translator box converts the computer interface protocol to the badge format and back. It contains a clock 42 similar to the one in the badges, which is used to program the badge clock 30 via connector 47. The system connects to the computer via a standard RS-232 interface 41, although any other interface would have been equally suitable. In one embodiment, the RS 232 signal is converted to a parallel format by the interface 41, then converted back to a serial format with convertor 43 with the appropriate control bits to access the badge via connector 46.

The computer connected at 40 can be programmed to generate random programs, edit those programs, save or recall those programs on a removable storage media, program the badge, test the badge, and verify the badge. The program format is largely dictated by style.

EXAMPLE

The operative components of the badge in this embodiment use a LCD which has eight individually-addressable shapes that can form a variety of geometrical configurations or symbols as shown in FIGS. 1 and 2.

A crystal-controlled clock which increments once every half-second, with a 24-bit capacity is used with a random-access memory (RAM) that retains information only while battery power is applied. A microprocessor is used so that at the end of pre-programmed time intervals (which can be non-uniform in length), it reads the next symbol configuration from the RAM and commands the driver of the display to change the displayed symbol to the new configuration. There are appropriate means of entering a sequence of configuration codes into the RAM and a battery that powers the entire device. All of these components are housed in a durable case that is designed to erase the RAM whenever the case is opened.

A RAM with only 2048 bits of memory can store 256 bytes (8-bit sequences) of code. Each 8-bit word can control the "ON" or "OFF" status of eight different portions of the liquid-crystal display. Thus, a badge with eight segments or shapes can be programmed to display 256 different configurations over whatever period of time the badge is intended to be active. More complex symbols can be generated by displays with larger numbers of segments and RAM with higher capacity (or the same capacity for a smaller number of configurations). For example, this application utilizes a liquid crystal display which can switch the shading of each shape among a plurality of possible shades. In this preferred embodiment the badge configuration can be readily legible at a distance of at least 25 feet and consequently, the complexity of the configuration must not become too detailed.

Liquid-crystal displays consume small amounts of power. Present-day micropower microprocessors and other components as described above can be powered for periods of up to one year by two miniature storage cells. All of the components cited are relatively inexpensive. The badge housing is designed to be opened non-destructively, e.g., to permit reprogramming and replacement of the ID photo and information. Such a feature will facilitate use of the badge for short-term employees, visitors with limited-time clearance, etc. A key feature of this configuration is that whenever the badge housing is opened, the power circuit to the RAM storing the time-varying LCD display sequence is opened, causing permanent loss of the display-sequence information. This renders the time-varying display inoperative until the badge is reprogrammed by the security organization. Thus, in this embodiment, any attempt to remove the personal identification information results in erasure of the stored cycle.

If a time-varying badge of any configuration is issued to a person who has clearance or authorization for only a very limited time, the RAM storing the LCD sequence need not be fully programmed for a longer time than that for which the person is authorized.

Those skilled in the art will recognize, or be able to ascertain using no more than routine experimentation, many equivalents to the sepcific embodiments of the invention described herein. Such equivalents are intended to be encompassed by the following claims.

I claim:

1. A plurality of reusable identification badges for identifying persons or objects, the badges comprising:
   a display panel on a housing of each badge to display a configuration of nonalphanumeric geometrical shapes for the visual identification of said person or object;
   a memory within each badge that stores a plurality of programmable configurations that form the nonalphanumeric geometrical shapes displayed on each display panel; and
   a control circuit within each badge that alters the programmable configurations displayed on that badge, wherein each of the plurality of badges is altered at a predetermined time interval such that each badge is synchronized with every other badge so that each badge displays the same configuration at any particular time.

2. The plurality of reusable identification badges of claim 1 wherein each panel comprises a plurality of shapes formed from a conductive material that is electrically connected to the control circuit such that an optical characteristic of each shape can be altered through the application of an electric signal to each shape material by the control circuit.

3. The plurality of reusable identification badges of claim 2 wherein each badge comprises a liquid crystal display such that each shape appearance can be altered by electronically switching the crystal display of each shape between a plurality of states.

4. An identification badge as defined in claim 2 wherein each configuration is comprised of said plurality of shapes such that each configuration has at least one shape whose appearance is different than the shape in any other configuration.

5. The plurality of reusable identification badges of claim 2 wherein each display panel is comprised of at least eight shapes.

6. The plurality of reusable identification badges of claim 1 wherein said control circuit further comprises means for sequencing the displayed configuration through a predetermined order of configurations.

7. The plurality of reusable identification badges of claim 1 wherein each badge further comprises a programming circuit to detect a programming signal, or any other electric signal from a source external to each badge, such that the programming circuit erases the memory upon detection of the signal.

8. The plurality of reusable identification badges of claim 1 further comprising a programming system to program the memory of each badge with the plurality of configurations.

9. The plurality of reusable identification badges of claim 1 further comprising means for opening the housing and for easing the stored configurations in response to the opening of the housing.

10. The plurality of reusable identification badges of claim 1 wherein said housing further comprises means for attaching the badge to a wearer.

11. The plurality of reusable identification badges of claim 10 further comprising means for erasing the stored configurations if the attaching means is removed from the badge.

12. The plurality of reusable identification badges of claim 1 wherein each badge housing further comprises means for displaying information describing a wearer of one of the plurality of badges.

13. The plurality of reusable identification badges of claim 1 wherein each display panel comprises a dot matrix display.

14. An identification badge as defined in claim 1 wherein said display is electrically powered by a battery.

15. The plurality of reusable identification badges of claim 1 further comprising:
   an attaching device to secure the housing of each badge to a person, the device having a release such that removal of the badge from the person without operating the release detaches the device from the housing; and
   an erasure circuit within each badge that is coupled to the device such that detachment of the device generates an electric signal in the erasure circuit to erase the configurations in the memory.

16. The plurality of reusable identification badges of claim 15 wherein the erasure circuit erases a programmed time interval stored within the memory at which the displayed configuration changes.

17. The plurality of reusable identification badges of claim 1 wherein each display panel comprises a liquid crystal display such that the intensity of the liquid crystal display for each shape can be altered to change the displayed configuration.

18. A method of using a time-varying identification badge system comprising the steps of:
   selecting an ordered plurality of configurations to be displayed as nonalphanumeric geometrical shapes on a display panel located on each of a plurality of badges;
   programming a memory in each badge to retain and alter the same configurations on each badge at predetermined time intervals according to the selected order, such that each badge is synchronized with every other badge in the system;
   attaching one of the badges to a person or object being identified;
   displaying the configurations on the attached badge such that each configuration can be visually identified; and visually comparing the displayed configuration on the attached badge with a configuration on an observable second badge of the plurality of badges to identify a person or object wearing the second badge.

19. A method as defined in claim 18, further comprising the steps of repeating said programming and attaching steps for the plurality of badges.

20. A method as defined in claim 18 further comprising the step of displaying information identifying the person.

21. A method as defined in claim 18 wherein said panel is comprised of a liquid crystal display.

22. A method as defined in claim 18 wherein said panel is comprised of a dot matrix display.

23. The method of claim 18 further comprising programming the memory of each badge with a plurality of different time intervals.

24. An identification system comprising:
a plurality of identification badges each having a display panel, wherein each display panel displays a configuration of nonalphanumeric geometrical shapes for the visual identification of a person or an object;
a display memory within each badge to store a plurality of programmable configurations to be displayed on each display panel such that the displayed configuration is the same on each badge;
a second memory connected to said display memory within each badge for storing a programmed time interval; and
a control circuit connected to said display and second memories within each badge, each control circuit having a clock such that the displayed configuration on each badge is altered to another of the configurations stored within the display memory of each badge at substantially the same programmed time interval.

25. The identification system of claim 24 wherein the second memory of each badge stores a plurality of time intervals at which the configuration on each badge is altered.

26. The identification system of claim 24 further comprising:
a programming system to program the display memory of each badge with the configurations to be displayed.

27. The identification system of claim 26 further comprising a programming circuit within each badge to detect a signal accessing the stored configurations from the programming system or any other electric signal source external to each badge such that the programming circuit erases the stored configurations upon detection of the signal.

* * * * *